US008455077B2

(12) United States Patent
Vinson et al.

(10) Patent No.: US 8,455,077 B2
(45) Date of Patent: Jun. 4, 2013

(54) FIBROUS STRUCTURES COMPRISING A REGION OF AUXILIARY BONDING AND METHODS FOR MAKING SAME

(75) Inventors: Kenneth Douglas Vinson, Toone, TN (US); Alan Howard Ullman, Cincinnati, OH (US); Charles Andrew Nolting, Hebron, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 354 days.

(21) Appl. No.: 11/800,618

(22) Filed: May 7, 2007

(65) Prior Publication Data

US 2007/0269627 A1 Nov. 22, 2007

Related U.S. Application Data

(60) Provisional application No. 60/800,725, filed on May 16, 2006.

(51) Int. Cl.

| | |
|---|---|
| ***B32B 3/10*** | (2006.01) |
| ***B32B 3/24*** | (2006.01) |
| ***B32B 5/02*** | (2006.01) |
| ***B32B 5/26*** | (2006.01) |
| ***B32B 7/14*** | (2006.01) |

(52) U.S. Cl.
USPC ............. 428/43; 428/131; 428/137; 428/192; 428/194; 428/195.1; 428/211.1; 428/156; 428/172; 428/906

(58) Field of Classification Search
USPC .......................................................... 428/131
See application file for complete search history.

(56) References Cited

U.S. PATENT DOCUMENTS

| | | | | | |
|---|---|---|---|---|---|
| 272,369 | A | * | 2/1883 | Wheeler | 242/160.1 |
| 1,507,949 | A | * | 9/1924 | Angier | 493/288 |
| 2,826,551 | A | | 3/1958 | Green | |
| 3,009,823 | A | * | 11/1961 | Drelich et al. | 428/114 |
| 3,047,444 | A | * | 7/1962 | Harwood | 428/153 |
| 3,059,313 | A | * | 10/1962 | Harmon | 428/198 |
| 3,301,746 | A | | 1/1967 | Sanford et al. | |
| 3,473,576 | A | | 10/1969 | Amneus | |
| 3,479,203 | A | * | 11/1969 | Broadhurst | 427/285 |
| 3,573,164 | A | | 3/1971 | Friedberg et al. | |
| 3,798,120 | A | * | 3/1974 | Enloe et al. | 162/112 |
| 3,821,068 | A | | 6/1974 | Shaw | |
| 3,825,381 | A | | 7/1974 | Dunning et al. | |
| 3,835,754 | A | * | 9/1974 | Lewyckyj | 493/346 |
| 3,949,035 | A | | 4/1976 | Dunning et al. | |

(Continued)

FOREIGN PATENT DOCUMENTS

| | | | | |
|---|---|---|---|---|
| DE | 19959832 | A1 | * | 7/2001 |
| EP | 0613979 | A1 | | 9/1994 |

(Continued)

OTHER PUBLICATIONS

Machine Translation of JP 2002017607 A, Jan. 2002.*

(Continued)

*Primary Examiner* — David Sample
*Assistant Examiner* — Jeff Vonch
(74) *Attorney, Agent, or Firm* — Wednesday G. Shipp; C. Brant Cook

(57) ABSTRACT

Fibrous structures, more particularly fibrous structures comprising a region of auxiliary bonding and methods for making same are provided.

9 Claims, 3 Drawing Sheets

U.S. PATENT DOCUMENTS

| | | | | | |
|---|---|---|---|---|---|
| 3,964,500 | A | | 6/1976 | Drakoff | |
| 3,974,025 | A | | 8/1976 | Ayers | |
| 3,994,771 | A | | 11/1976 | Morgan, Jr. et al. | |
| 4,100,017 | A | * | 7/1978 | Flautt, Jr. | 162/111 |
| 4,100,324 | A | | 7/1978 | Anderson et al. | |
| 4,158,594 | A | * | 6/1979 | Becker et al. | 162/112 |
| 4,166,011 | A | | 8/1979 | Lugstenmann et al. | |
| 4,191,609 | A | | 3/1980 | Trokhan | |
| 4,195,787 | A | * | 4/1980 | Thomason | 40/360 |
| 4,238,541 | A | * | 12/1980 | Burton | 428/43 |
| 4,239,065 | A | | 12/1980 | Trokhan | |
| 4,300,981 | A | | 11/1981 | Carstens | |
| 4,364,837 | A | | 12/1982 | Pader | |
| 4,512,478 | A | * | 4/1985 | Korte | 229/206 |
| 4,528,239 | A | | 7/1985 | Trokhan | |
| 4,613,447 | A | | 9/1986 | Hara et al. | |
| 4,637,859 | A | | 1/1987 | Trokhan | |
| 4,900,377 | A | | 2/1990 | Redford et al. | |
| 5,059,282 | A | | 10/1991 | Ampulski et al. | |
| 5,114,771 | A | * | 5/1992 | Ogg et al. | 428/43 |
| 5,215,626 | A | | 6/1993 | Ampulski et al. | |
| 5,246,545 | A | | 9/1993 | Ampulski et al. | |
| 5,354,425 | A | | 10/1994 | Mackey et al. | |
| 5,449,551 | A | | 9/1995 | Taniguchi | |
| 5,525,345 | A | | 6/1996 | Warner et al. | |
| 5,529,665 | A | | 6/1996 | Kaun | |
| 5,552,020 | A | | 9/1996 | Smith et al. | |
| 5,605,731 | A | * | 2/1997 | Guasch Pubill | 428/43 |
| 5,753,331 | A | * | 5/1998 | Jeffrey | 428/43 |
| 5,755,654 | A | * | 5/1998 | Schulz et al. | 493/350 |
| 5,840,403 | A | | 11/1998 | Trokhan et al. | |
| 5,846,380 | A | * | 12/1998 | Van Phan et al. | 162/111 |
| 5,972,456 | A | * | 10/1999 | Esquivel | 428/43 |
| 5,989,682 | A | * | 11/1999 | Anderson | 428/152 |
| 6,241,850 | B1 | | 6/2001 | Kelly | |
| 6,547,928 | B2 | | 4/2003 | Barnholtz et al. | |
| 6,607,637 | B1 | | 8/2003 | Vinson et al. | |
| 6,755,939 | B2 | | 6/2004 | Vinson et al. | |
| 6,797,117 | B1 | | 9/2004 | McKay et al. | |
| 6,855,229 | B2 | | 2/2005 | McKay et al. | |
| 6,929,838 | B1 | * | 8/2005 | McNeil | 428/43 |
| 7,914,866 | B2 | * | 3/2011 | Shannon et al. | 428/35.2 |
| 2003/0013627 | A1 | | 1/2003 | Bermejo et al. | |
| 2003/0077314 | A1 | * | 4/2003 | Shannon et al. | 424/443 |
| 2003/0111169 | A1 | * | 6/2003 | Baggot et al. | 156/251 |
| 2003/0119397 | A1 | * | 6/2003 | Von Paleske | 442/149 |
| 2004/0188047 | A1 | | 9/2004 | Nakamura et al. | |
| 2004/0255396 | A1 | | 12/2004 | Vinson et al. | |
| 2005/0136097 | A1 | | 6/2005 | Hsu | |
| 2007/0044930 | A1 | | 3/2007 | Vinson et al. | |
| 2007/0049142 | A1 | | 3/2007 | Vinson | |

FOREIGN PATENT DOCUMENTS

| | | | | |
|---|---|---|---|---|
| EP | 1 312 466 | A1 | | 5/2003 |
| GB | 849433 | | | 9/1960 |
| JP | 2002017607 | A | * | 1/2002 |
| WO | WO 97/30217 | A1 | | 8/1997 |
| WO | WO 00/04230 | A1 | | 1/2000 |
| WO | WO 03/005981 | A2 | | 1/2003 |
| WO | WO 2006/027810 | A1 | | 3/2006 |
| WO | WO 2006027810 | | * | 3/2006 |

OTHER PUBLICATIONS

Machine Translation of DE 19959832 A1, Jul. 2001.*

Full Translation of JP 2002-017607 A, Jan. 2002.*

Geffroy, et al., "Molar Mass Selectivity in the Adsorption of Polyacrylates on Calcite", *Colloids and Surfaces, A: Physicochemical and Engineering Aspects*, vol. 162, pp. 107-121 (2000).

International Search Report dated Nov. 16, 2007.

* cited by examiner

FIBROUS STRUCTURES COMPRISING A REGION OF AUXILIARY BONDING AND METHODS FOR MAKING SAME

CROSS REFERENCE TO RELATED APPLICATIONS

This application claims the benefit of U.S. Provisional Application No. 60/800,725, filed May 16, 2006.

FIELD OF THE INVENTION

The present invention relates to fibrous structures, more particularly to fibrous structures comprising a region of auxiliary bonding, especially a region of auxiliary bonding that contains within it a region of fiber disruption, and methods for making same.

BACKGROUND OF THE INVENTION

Fibrous structures, especially through-air-dried fibrous structures and sanitary tissue products incorporating such fibrous structures, have been plagued with dust problems. A major source of dust from fibrous structures are regions of fiber disruption, including but not limited to, solid state disruption zones (such as perforated areas, embossed areas, and the like) in the fibrous structure.

Over the years, formulators have failed to improve the dust problems, especially the dust problems originating from solid state disruption zones. As a result, consumers continue to be subjected to a cloud of dust from fibrous structures, especially sanitary tissue products, during use, especially when dispensing sheets from a convolutedly wound roll of sanitary tissue product.

Accordingly, there is a need for a fibrous structure and/or sanitary tissue product comprising such fibrous structure that utilizes auxiliary bonding to reduce the dust from fibrous structures and/or sanitary tissue products and a method for making same.

SUMMARY OF THE INVENTION

The present invention fulfills the needs described above by providing a fibrous structure and/or a sanitary tissue product comprising such a fibrous structure that utilizes auxiliary bonding to reduce the dust generated from fibrous structures and/or sanitary tissue products, especially during use by a consumer and a method for making same.

In one example of the present invention, a fibrous structure comprising a region of auxiliary bonding, wherein the region of auxiliary bonding contains within it a region of fiber disruption wherein both regions are continuous or discrete, is provided.

In another example of the present invention, a single- or multi-ply sanitary tissue product comprising a fibrous structure according to the present invention, is provided.

In even another example of the present invention, a method for reducing the dust generated by a fibrous structure and/or sanitary tissue product, the method comprising the step of imparting a region of auxiliary bonding and a region of fiber disruption to the fibrous structure and/or sanitary tissue product, wherein the region of fiber disruption is contained within the region of auxiliary bonding and wherein both regions are either continuous or discrete, is provided. In one example, the region of fiber disruption is selected from the group consisting of: regions of perforation, regions of saw cut, regions of embossments, and mixtures thereof.

In yet another example of the present invention, a method for reducing the dust generated by a single-ply fibrous structure and/or single-ply sanitary tissue product, the method comprising the step of imparting a solid state disruption zone and an auxiliary bonding region in the fibrous structure and/or sanitary tissue product, wherein the zone and region at least partially overlap, is provided.

In even still another example of the present invention, a method for reducing the dust generated by a fibrous structure and/or a sanitary tissue product, the method comprising the step of imparting a region of fiber disruption comprising a dust inhibiting agent in the fibrous structure and/or sanitary tissue product, is provided.

In even another example of the present invention, a fibrous structure that exhibits a normalized dispensing dust value of less than about 3500 as measured by the Dispensing Dust Test Method provided herein, is provided.

In yet even another example of the present invention, a fibrous structure is provided which has a dispensing dust value reduced by creating a region of auxiliary bonding wherein the region of auxiliary bonding alters the dispensing dust by decreasing the normalized dispensing dust relative to the fibrous structure without the region of auxiliary bonding, is provided.

In still yet another example of the present invention, a single-ply sanitary tissue product comprising a solid state disruption zone and an auxiliary bonding region within the sanitary tissue product, wherein the zone and the region at least partially overlap, is provided.

DETAILED DESCRIPTION OF THE INVENTION

Figure 1:
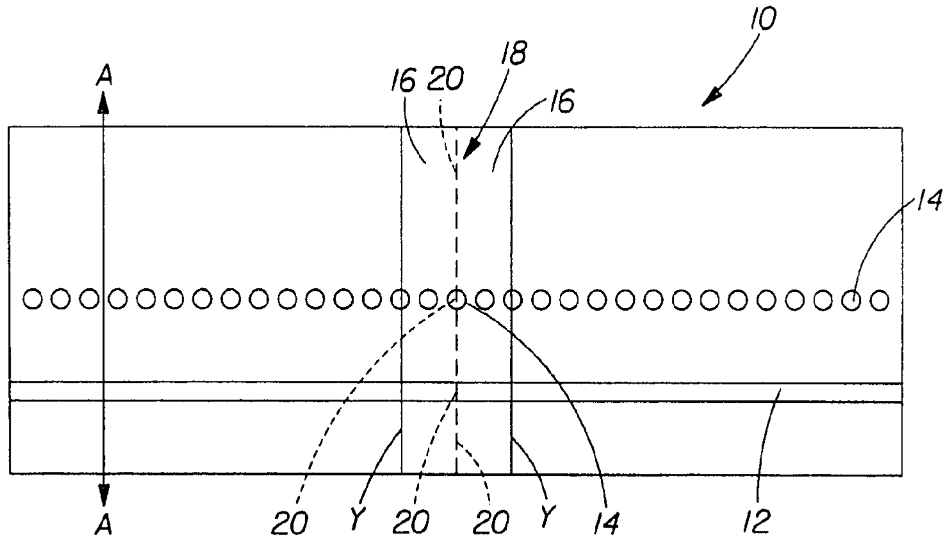
FIG. 1 is a schematic representation of a fibrous structure for explanatory purposes.

"Fiber" as used herein means an elongate particulate having an apparent length greatly exceeding its apparent width, i.e. a length to diameter ratio of at least about 10. More specifically, as used herein, "fiber" refers to papermaking fibers. The present invention contemplates the use of a variety of papermaking fibers, such as, for example, natural fibers or synthetic fibers, or any other suitable fibers, and any combination thereof. Papermaking fibers useful in the present invention include cellulosic fibers commonly known as wood pulp fibers.

In addition to the various wood pulp fibers, other cellulosic fibers such as cotton linters, rayon, and bagasse can be used in this invention. Synthetic fibers, such as polymeric fibers, can also be used. Elastomeric polymers, polypropylene, polyethylene, polyester, polyolefin, polyvinyl alcohol and nylon, can be used. The polymeric fibers may comprise natural polymers from sources such as starch sources, protein sources and/or cellulose sources. The polymeric fibers can be produced by spunbond processes, meltblown processes, and other suitable methods known in the art.

An embryonic fibrous web can be typically prepared from an aqueous dispersion of papermaking fibers, though dispersions in liquids other than water can be used. The fibers are dispersed in the carrier liquid to have a consistency of from about 0.1 to about 0.3 percent. It is believed that the present invention can also be applicable to moist forming operations where the fibers are dispersed in a carrier liquid to have a consistency of less than about 50% and/or less than about 10%.

“Fibrous structure” as used herein means a structure that comprises one or more fibers. In one example, a fibrous structure according to the present invention means an orderly arrangement of fibers within a structure in order to perform a function. Nonlimiting examples of fibrous structures of the present invention include composite materials (including reinforced plastics and reinforced cement), paper, fabrics (including woven, knitted, and non-woven), and absorbent pads (for example for diapers or feminine hygiene products). A bag of loose fibers is not a fibrous structure in accordance with the present invention.

Nonlimiting examples of processes for making fibrous structures include known wet-laid papermaking processes and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous suspension is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

The fibrous structures of the present invention may be homogeneous or may be layered. If layered, the fibrous structures may comprise at least two and/or at least three and/or at least four and/or at least five layers.

“Sanitary tissue product” as used herein means a soft, low density (i.e. <about 0.15 g/cm3) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a roll of sanitary tissue product.

In one example, the fibrous structure and/or the sanitary tissue product may comprise two or more contiguous sheets that are perforated such that the two or more contiguous sheets can be separated from one another during use by a consumer.

“Auxiliary bonding” as used herein means a higher level of bonding and/or a different nature of bonding (such as different mechanism of bonding, for example bonding via surface tension rather than via hydrogen bonding) present in at least one region of the x/y plane of a fibrous structure and/or sanitary tissue product compared to at least one other region of the x/y plane of a fibrous structure and/or sanitary tissue product. The region that is auxiliary bonded may not, overall, be bonded to a greater degree than other regions of the fibrous structure. For example, the auxiliary bonded region could have a lower level of one type of bond, but a higher level of another and net, have overall less network strength, e.g. as measured by tensile strength.

“Nature of bonding” as used herein refers to the classification of types of fiber-to-fiber bonds. Auxiliary bonding may be result of any suitable fiber-to-fiber bonds. A nonlimiting list of classification of types of fiber-to-fiber bonds follows. In one example, fibers may be bonded to one another by use of a bonding agent which encapsulates areas where fibers cross or are otherwise proximate to one another. The bonding agent may be an adhesive, a lubricant (such as oils and fats) and combinations thereof. Nonlimiting examples of adhesives include polymers, which, for example, upon drying or cooling joins the fibers by at least partially encapsulating them. The strength of the bond between the fibers is influenced by the internal strength of the polymer. The greater the internal strength of the polymer the greater the bond strength. Lubricants can be used as the bonding agent. Without being bound by theory, it is believed that lubricants serve as auxiliary bond agents by wetting adjacent fibers and creating surface tension between the wetted fibers, the surface tension functioning to “bond” the fibers together. It is not expected that a lubricant will actually increase the web strength with this type of bonding. In fact, lubricants can actually reduce the web strength by destroying one nature of bonds, e.g. hydrogen bonds, while creating fewer, weaker lubricant bonds.

In another example, fibers may be bonded together by adding a bonding agent to the fibers, wherein the bonding agent contains a moiety or moieties capable of bonding with the fibers (the bonding agent may be attracted to the fibers via van der waals forces, hydrogen bonds, ionic bonds covalent bonds, and combinations thereof). The bonding agent is attracted to adjacent fibers, unlike the agents for encapsulation which do not exhibit a chemical attraction to adjacent fibers. Nevertheless, the bonding agents that are attracted to adjacent fibers can still encapsulate the fibers in addition to chemically bonding with the fibers.

In yet another example, fibers may be bonded together autogenously (i.e., without the necessity of a bonding agent. For example, if fiber surfaces possess a moiety which is capable of attracting a moiety from an adjacent fiber, autogenous bonding can take place. Nonlimiting examples of such moieties that are capable of attracting a moiety from an adjacent fiber include moieties that can be attracted via van der waals forces, hydrogen bonds, ionic bonds, covalent bonds, and combinations thereof. Additionally, autogenous bonding can be created by fusing adjacent fibers together for example by melting or partially dissolving adjacent fibers. In one example, adjacent fibers may form direct ion pairing if the fibers possess a combination of cationic, anionic, and/or amphoteric moieties such that the fibers have an ionic attraction for one another. In another example, adjacent fibers may form van der waals bonds or hydrogen bonds if the fibers possess a functional group capable of forming these types of bonds (for example, the removal of water from a fibrous structure containing cellulose fibers can create hydrogen bonds between adjacent fibers). In even another example, adjacent fibers may form covalent bonds if the fibers possess a functional group capable of covalently reacting when the fibers are brought into proximity with one another. In still another example, adjacent fibers may be bonded together autogenously by fusing adjacent fibers together, for example by melting or partially dissolving adjacent fibers. The dissolving action may be accomplished by the controlled addition of a fugitive or non-fugitive solvent for the fibers.

Contact by an apparatus capable of fiber disruption within the fibrous structure and/or sanitary tissue product may aid in the creation of auxiliary bonding within the fibrous structure and/or sanitary tissue product.

"Region of auxiliary bonding" as used herein means a region within the fibrous structure and/or sanitary tissue product that exhibits auxiliary bonding. From about 1% and/or 2% and/or 5% and/or 10% to about 95% and/or 90% and/or 75% of the surface area of the fibrous structure may comprise regions of auxiliary bonding.

Auxiliary bonding within a particular region of a fibrous structure and/or sanitary tissue product can be identified by any suitable method known in the art. A nonlimiting example of such a method includes qualitative and/or quantitative analysis directed at auxiliary bonding agents within the region ("tested region") compared to at least one other region outside of the tested region ("comparison region") of the fibrous structure. The presence of an auxiliary bonding agent in the tested region and the absence of or a different level of an auxiliary bonding agent in the comparison region is indirect, obvious evidence of auxiliary bonding.

In cases where the auxiliary bonding is not achieved by applying an auxiliary bonding agent, direct observations of auxiliary bonding are recommended for detecting the presence of auxiliary bonding. These cases include auxiliary bonding achieved via autogenous bonding and/or varying strength per bond and/or frequency of bonds while employing the same auxiliary bonding mechanism within as well as outside the tested region. Nonlimiting methods which can be employed for direct observation of auxiliary bonding include making comparative stress/strain observations on small samples of the fibrous structure within and outside of the tested region and/or making microscopic observations of fiber/fiber contact areas inside and outside of the tested region. If such microscopic observations reveal larger areas of contact between fibers or larger numbers of contacts per unit of fiber length, then auxiliary bonding is present in the tested region.

"Auxiliary bonding agent" is a material which acts to bond fibers in a fibrous structure in a region of auxiliary bonding. Typically, the auxiliary bonding agent will be present only in a region of auxiliary bonding; however, it is permissible for the auxiliary bonding agent to be present outside regions of auxiliary bonding, e.g. at a lower level or otherwise less effective form.

"Fiber disruption" as used herein means that fibers within a fibrous structure and/or sanitary tissue product have been cut, mashed, stretched, pulled apart or otherwise disrupted from the fibers' original state, and combinations thereof.

Fiber disruption may be imparted to the fibrous structure and/or sanitary tissue product by any suitable fiber disruption operation. Nonlimiting examples of suitable fiber disruption operations include cutting, mashing, sawing, punching, perforating, embossing, tearing, stretching (such as a result of embossing), needle punching, tuft generating and combinations thereof.

Nonlimiting examples of suitable fiber disruption apparatuses include knives, embossing rolls, log saws, perfing blades, needle punchers, selfing and/or microselfing rolls, ring rolls and combinations thereof.

The fiber disruption apparatus may be heated such that it is able to increase the temperature of the fibers and/or any auxiliary bonding agent present within the fibrous structure and/or sanitary tissue product above its Tg.

The fiber disruption apparatus may comprise an auxiliary bonding agent such that it can transfer the auxiliary bonding agent to the fibers within a fibrous structure and/or sanitary tissue product during a fiber disruption operation.

"Region of fiber disruption" as used herein means a region of the fibrous structure and/or sanitary tissue product that exhibits fiber disruption. Nonlimiting examples of regions of fiber disruption include perforation regions, saw cut regions, protruding regions and combinations thereof. In one example, protruding regions may be formed in the fibrous structure while the fibrous structure has a moisture content greater than about 20%. In other words, the protruding regions may be formed for example during a through-air-drying operation during a papermaking process on a paper machine. In another example, protruding regions may be formed in the fibrous structure while the fibrous structure has a moisture content less than about 20%. In other words, the protruding regions may be formed for example during an embossing operation during a converting process. From about 1% and/or 2% and/or 5% and/or 10% to about 95% and/or 90% and/or 75% of the surface area of the fibrous structure may comprise regions of fiber disruption. The region of fiber disruption may be a solid state disruption zone.

"Solid state disruption zone" as used herein means a region of fiber disruption within a fibrous structure and/or sanitary tissue product wherein the fiber disruption has occurred while the structure is essentially dry, for example less than about 20% moisture and/or less than about 15% moisture and/or less than about 10% moisture and/or less than about 7% moisture. Nonlimiting examples of solid state disruption zones may be formed from contact with the fibrous structure and/or sanitary tissue product, wherein the contact is selected from the group consisting of: cutting, mashing, sawing, punching, perforating, embossing, tearing, stretching, needle punching, tuft generating and combinations thereof.

"Contains within it" and/or "contained within it" as used herein means that one region's boundaries are positioned entirely or substantially entirely within the boundaries of another region. For example, the boundaries of a region of fiber disruption may be positioned entirely within the boundaries of a region of auxiliary bonding.

"Continuous" as used herein with respect to a region for example, means a region that extends the entire machine direction length of a fibrous structure and/or sanitary tissue product. An example of a continuous region of auxiliary bonding is plybond glue that is applied to a fibrous structure and/or sanitary tissue product by spraying a stripe that extends the entire machine direction length of the structure or product.

"Discrete" as used herein with respect to a region for example, means a region that does not extend the entire machine direction length of the fibrous structure and/or sanitary tissue product. In one example, a discrete region may extend the entire cross machine direction of a fibrous structure and/or sanitary tissue product. In another example, a discrete region may extend less than the entire machine direction length of a fibrous structure and/or sanitary tissue product. For example, a discrete region of auxiliary bonding is plybond glue applied intermittently rather than a stripe, as discussed above.

Recognizing that a continuous region, such as a continuous stripe, may be composed of dots, lines or similar elements, each of which does not, by itself, necessarily extend the entire length of the fibrous structure, we find it useful to define a stripe as being continuous if no 100 μm-wide imaginary line can be drawn in the cross direction of the fibrous structure without crossing at least one element of the stripe, i.e. to be discrete, a 100 μm-wide imaginary line can be drawn in the cross direction of the fibrous structure such that it does not cross at least one element of the stripe.

FIG. 1 is a schematic representation of a nonlimiting example of a fibrous structure 10 having a continuous auxiliary bonding region 12 (since all imaginary lines exemplified by A-A cross at least one element of the stripe), discrete auxiliary bonding regions 14, 16 (since imaginary line A-A does not cross at least one element of the stripe) (imaginary lines Y are shown in the drawing to depict the region of auxiliary bonding) and a discrete fiber disruption region 18, a perfed region, which is made up of numerous fiber disruption subregions 20. As is clear, the continuous auxiliary bonding region 12 encompasses a discrete fiber disruption region 18 consisting of a single fiber disruption subregion 20. Therefore, that execution does not fall with the claimed invention. However, the discrete auxiliary bonding region 14 does contain within it a discrete fiber disruption subregion 20 and thus, falls within the claim invention. Further, the discrete auxiliary bonding region 16 does contain within it a discrete fiber disruption region 18, which is made up of numerous fiber disruption subregions 20, and thus, falls within the claim invention.

"Basis Weight" as used herein is the weight per unit area of a sample reported in lbs/3000 $ft^2$ or $g/m^2$. Basis weight is measured by preparing one or more samples of a certain area ($m^2$) and weighing the sample(s) of a fibrous structure according to the present invention and/or a paper product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples ($m^2$). The basis weight ($g/m^2$) is calculated by dividing the average weight (g) by the average area of the samples ($m^2$).

"Caliper" as used herein means the macroscopic thickness of a sample. Caliper of a sample of fibrous structure according to the present invention is determined by cutting a sample of the fibrous structure such that it is larger in size than a load foot loading surface where the load foot loading surface has a circular surface area of about 3.14 $in^2$ (20.3 $cm^2$). The sample is confined between a horizontal flat surface and the load foot loading surface. The load foot loading surface applies a confining pressure to the sample of 15.5 $g/cm^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in millimeters.

"Density" or "Apparent density" as used herein means the mass per unit volume of a material. For fibrous structures, the density or apparent density can be calculated by dividing the basis weight of a fibrous structure sample by the caliper of the fibrous structure sample with appropriate conversions incorporated therein. Density and/or apparent density used herein has the units $g/cm^3$.

"Dry Tensile Strength" (or simply "Tensile Strength" as used herein) of a fibrous structure and/or sanitary tissue product is measured as follows. One (1) inch by five (5) inch (2.5 cm×12.7 cm) strips of fibrous structure and/or sanitary tissue product are provided. The strip is placed on an electronic tensile tester Model 1122 commercially available from Instron Corp., Canton, Mass. in a conditioned room at a temperature of 73° F.±4° F. (about 28° C.±2.2° C.) and a relative humidity of 50%±10%. The crosshead speed of the tensile tester is 2.0 inches per minute (about 5.1 cm/minute) and the gauge length is 4.0 inches (about 10.2 cm). The Dry Tensile Strength can be measured in any direction by this method. The "Total Dry Tensile Strength" or "TDT" is the special case determined by the arithmetic total of MD and CD tensile strengths of the strips.

"Machine Direction" or "MD" as used herein means the direction parallel to the flow of the fibrous structure through the papermaking machine and/or product manufacturing equipment.

"Cross Machine Direction" or "CD" as used herein means the direction perpendicular to the machine direction in the same plane of the fibrous structure and/or paper product comprising the fibrous structure.

"Dispensing Tensile Strength" as used herein means the Dry Tensile Strength of a fibrous structure tested across the border of two sheets, i.e. a perforation region within the fibrous structure. The perforation region is centered in the gauge length, i.e. positioned 2 inches from each clamping jaw of the tensile tester.

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself.

"Lubricant" as used herein means any non-volatile substance derived from natural animal, vegetable, mineral, and/or synthetic sources and liquid or pasty under use conditions (for example, temperatures from about 23 to 120° C.) and possessing slipperiness property. Lubricants may be present or used "neat" or they may be more conveniently delivered as a component of an aqueous-based dispersion, even those dispersions that comprise a continuous phase comprising water or some other polar solvent.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Fibrous Structure

In one example, the fibrous structures of the present invention may comprise a region of auxiliary bonding. The region of auxiliary bonding may contain within it a region of fiber disruption.

In another example, the fibrous structures of the present invention comprise a region of auxiliary bonding wherein the region of auxiliary bonding comprises an auxiliary bonding agent. The auxiliary bonding agent may be applied to a fibrous structure at any time. For example, if the fibrous structure is subjected to a fiber disruption operation, such as a solid state disruption operation, the auxiliary bonding agent may be applied to the fibrous structure prior to, concurrently or after such fiber disruption operation.

When present, the fibrous structure may comprise at least about 0.1% by weight, on a dry fibrous structure basis of an auxiliary bonding agent. In one example, the fibrous structure may comprise at least about 0.1% and/or at least about 0.25% and/or at least about 0.5% and/or at least about 1% to about 5% and/or to about 3% and/or to about 1.5% and/or to about 0.75% by weight, on a dry fibrous structure basis of an auxiliary bonding agent.

In addition to the auxiliary bonding agent, if any, within the fibrous structures of the present invention, the fibrous structures of the present invention may comprise any suitable ingredients known in the art. Nonlimiting examples of suitable ingredients that may be included in the fibrous structures include permanent and/or temporary wet strength resins, dry strength resins, softening agents, wetting agents, lint resisting agents, absorbency-enhancing agents, immobilizing agents, especially in combination with emollient lotion compositions, antiviral agents including organic acids, antibacterial agents, polyol polyesters, antimigration agents, polyhydroxy plasticizers, opacifying agents and mixtures thereof. Such ingredients, when present in the fibrous structure of the present invention, may be present at any level based on the dry weight of the fibrous structure. Typically, such ingredients, when present, may be present at a level of from about 0.001 to about 50% and/or from about 0.001 to about 20% and/or from about 0.01 to about 5% and/or from about 0.03 to about 3% and/or from about 0.1 to about 1.0% by weight, on a dry fibrous structure basis.

The fibrous structures of the present invention may be of any type, including but not limited to, conventionally felt-pressed fibrous structures; pattern densified fibrous structures; and high-bulk, uncompacted fibrous structures. The fibrous structures may be creped or uncreped and/or through-dried or conventionally dried. The sanitary tissue products made therefrom may be of a single-ply or multi-ply construction.

The fibrous structures of the present invention and/or sanitary tissue products comprising such fibrous structures may have a basis weight of between about 10 g/m$^2$ to about 120 g/m$^2$ and/or from about 14 g/m$^2$ to about 80 g/m$^2$ and/or from about 20 g/m$^2$ to about 60 g/m$^2$.

The fibrous structures of the present invention and/or sanitary tissue products comprising such fibrous structures may have a total dry tensile strength of greater than about 59 g/cm (150 g/in) and/or from about 78 g/cm (200 g/in) to about 394 g/cm (1000 g/in) and/or from about 98 g/cm (250 g/in) to about 335 g/cm (850 g/in).

The fibrous structures of the present invention and/or sanitary tissue products comprising such fibrous structures may have a dispensing tensile strength of greater than about 20 g/cm (50 g/in) and/or from about 39 g/cm (100 g/in) to about 192 g/cm (500 g/in) and/or from about 49 g/cm (125 g/in) to about 168 g/cm (425 g/in).

The fibrous structures of the present invention and/or sanitary tissue products comprising such fibrous structures may have a density of about 0.60 g/cc or less and/or about 0.30 g/cc or less and/or from about 0.04 g/cc to about 0.20 g/cc.

The fibrous structures of the present invention and/or sanitary tissue products comprising such fibrous structures may have a lint of about 2 or more and/or about 4 or more and/or from about 6 or more to about 12 or less and/or about 10 or less and/or about 8 or less, as measured by the Lint Test Method described herein.

Auxiliary Bonding Agents

Nonlimiting examples of suitable auxiliary bonding agents for use in the present invention include polymers, lubricants and mixtures thereof.

In one example, the auxiliary bonding agent comprises a dust inhibiting agent. Nonlimiting examples of dust inhibiting agents include lubricants even though the bonding strength they impart is minimal, indeed they may destroy bonding of one nature while elevating bonding of another nature to the effect that net bonding as judged by network strength such as tensile strength, for example, might actually be reduced by the addition of the lubricant. The lubricant may comprise a low migration lubricant. Low migration means that the lubricant tends to remain in or near the zone wherein it is deposited rather than spreading throughout the fibrous structure. Low migration properties may be imparted for example by using a pasty or solid lubricant. Pasty lubricants are semi-solid and thus may be usable as-is, i.e. they may be pumped, conveyed, extruded, printed, transferred, etc. Solid lubricants can be fused under conditions of elevated temperature deposition and then frozen upon cooling. Low migration property may also be imparted by using a reactive system as the lubricant, e.g. a solid lubricant may be emulsified in a aqueous dispersion for use in the deposition step and the absorption and/or drying of the aqueous carrier renders the lubricant immobile. Other physical reactions as well as chemical reaction of the components of the lubricant system to otherwise alter mobility are also envisioned. It is also possible to achieve low migration by using a lubricant with a tendency to irreversibly react with the fibers of the fibrous structure by physical or chemical bonds. The low migration lubricant may be obtained from a source selected from the group consisting of: animal sources, mineral sources, vegetable sources, synthetic sources and mixtures thereof.

Nonlimiting examples of suitable lubricants include natural mineral based materials including mineral oil and wax; natural animal and vegetable based materials including animal and vegetable waxes, and triglyceride fats and oils; and synthetic materials including synthetic oils and waxes.

Mineral oils are suitable as the lubricant of the present invention. Mineral oil is typically taken as a fraction of crude oil. An example of a suitable mineral oil is distributed by Chevron Corporation of San Ramon, Calif. under the tradename "Paralux", such as Paralux 1001 and/or Paralux 6001.

Synthetic oils are also suitable for lubricant of the present invention. Synthetic mineral oils include those made from synthetic crude oil, i.e. upgraded bitumen. Synthetic oils created by the polymerization of methane by the Fischer-Tropsch process are also suitable.

Synthetic oils made by esterification of alcohols with fatty acids or other similar processes are also suitable for use in the present invention. For example, a methyl ester of fatty acids derived from soybean oil is suitable. The process used to create this oil is to saponify the triglyercide, i.e. soybean oil, with caustic soda in the presence of methanol. This yields glycerin and the methyl esters of the fatty acids, which can be readily separated. The methyl esters thus produce include a blend of methyl stearate, methyl linoleate, methyl linoleneate, and methyl palmitate and minor fractions of others.

Silicone fluids including silicone oils, gels, and waxes may also be used as the lubricant in the present invention. Silicones are typically polydimethylsiloxane based materials and may contain other functional groups within or appended to the silicone backbone.

Wax as used herein is used to indicate any material with the properties of being non-water soluble, hydrophobic, plastic (i.e. malleable) at normal ambient temperatures, a melting point above about 45° C., a relatively low viscosity when melted. Waxes are similar to but distinguished from fats and oils by their higher melting point and/or hardness and/or brittleness.

One suitable lubricant is petrolatum which is a hydrocarbon having 16-32 carbon atom chain lengths (also known as "mineral wax," "petroleum jelly" and "mineral jelly"). Petrolatum usually refers to more viscous mixtures of hydrocarbons having from 16 to 32 carbon atoms. A suitable petrolatum is grade G1813 available from Crompton, Inc. of Petrolia, Pa. Other suitable petroleum waxes include paraffin and microcrystalline wax. Paraffin is a mixture of high-molecular-weight alkanes i.e., saturated hydrocarbons with the general formula $C_nH_{2n+2}$, where n is an integer between 22 and 27, obtained from petroleum during refining, and melting between about 47° C. and 65° C.

Waxes also include materials with similar properties such as animal and insect waxes including beeswax, lanolin (wool wax), Chinese wax, shellac wax, and spermaceti wax; vegetable waxes including carnauba wax, castor wax, candelilla wax, bayberry wax, esparto wax, ouricury wax, and rice bran wax; and mineral waxes including ceresin wax, montan wax, ozocerite, and peat wax.

Other suitable waxes include synthetic waxes based on polyethylene, Fischer-Tropsch hydrocarbon waxes, substituted amide waxes, and polymerized $\alpha$-olefins.

Waxes, including petrolatum, are low migration lubricants compared to oils such as mineral oil, although those skilled in art will recognize that mineral oil may be modified to make it lower migration by additives including soluble polymers including polyisobutylene.

Lubricants may further include natural animal and vegetable oils and fats. Such fats and oils are triglycerides, i.e., they are glycerol fatty esters. In one example, the predominant range of fatty acid chains commonly varies from $C_8$ to $C_{22}$ and/or from $C_{12}$ to $C_{20}$ and/or from $C_{16}$ to $C_{18}$. The fatty acid chains can be saturated or unsaturated. Carbon-carbon double bonds defining such unsaturation within the fatty acid chains can be cis or trans in configuration. Such oils and fats will be hardened (increased in melting point) if the fatty chains are 1) longer, 2) more saturated, 3) low in polyunsaturation, 4) unsaturation present as trans configuration and 5) unbranched. Example triglycerides for use as the lubricant in the present invention include tallow, palm oil (including palm olein and/or palm stearin), lard, and hydrogenated soybean oil.

Lubricants may further include glycols (such as propylene glycol and/or glycerine), polyglycols (such as triethylene glycol, polyethylene glycol, poly propylene glycol), fatty acids, fatty alcohols, fatty alcohol ethoxylates, fatty alcohol esters and fatty alcohol ethers, fatty acid ethoxylates, fatty acid amides and fatty acid esters, squalene, and fluorinated emollients.

Auxiliary bonding agents may be polymers. Polymers may already be in the form of polymers at application or polymerization may take place in situ, i.e. a sub-polymer agent or group of agents may be applied to the fibrous structure where the agent or agents react to become a polymer.

Among the polymers suitable for the auxiliary bonding agent of the present invention includes the group of dry and wet strength agents for paper structures well known to those skilled in the art. A nonlimiting list of the dry strength agents in this group consists of polyacrylamides starch and starch derivatives.; polyvinyl alcohol; natural gums and mucilages such as guar and locust bean gums; and/or cellulose derivatives including carboxymethyl cellulose. Exemplary starch materials include potato starch and corn starch including hybrid based starches such as high amylose corn starch and waxy maize starch. Other exemplary starch materials which may be used include modified starches such as those modified to have nitrogen containing groups such as amino groups and methylol groups attached to nitrogen. A nonlimiting list of the wet strength agents include so-called temporary wet strength agents and permanent wet strength agents. Among temporary wet strength agents are polyaldehyde polymers such as cationic, aldehyde functionalized starches and cationic, aldehyde functionalized polyacrylamides such as Parez 750B commercially available from Lanxess Corporation. Among permanent wet strength agents including polyamide-epichlorohydrin resins. These materials are low molecular weight polymers provided with reactive functional groups such as amino, epoxy, and azetidinium groups and polyacrylamide resins such as those sold under the Parez™, such as Parez 631NC commercially available from Lanxess Corporation. Still other permanent wet strength agents are the urea formaldehyde and melamine formaldehyde resins. These polyfunctional, reactive polymers have molecular weights on the order of a few thousand. The more common functional groups include nitrogen containing groups such as amino groups and methylol groups attached to nitrogen and polyethylenimine type resins. More complete descriptions of the aforementioned wet strength resins, including their manufacture, can be found in TAPPI Monograph Series No. 29, Wet Strength In Paper and Paperboard. Technical Association of the Pulp and Paper Industry (New York; 1965), incorporated herein by reference. As used herein, the term "permanent wet strength agent" refers to an additive which allows the bonded region, when placed in an aqueous medium, to keep a majority of its initial wet strength for a period of time greater than at least ten minutes. As used herein, the term "temporary wet strength agent" refers to an additive which delivers initial wet strength in the bonded region but allows the bonded region, when placed in an aqueous medium, to lose a majority of its initial wet strength for a period of time less than ten minutes.

One acceptable form for the polymer auxiliary bonding agent is as a hot melt adhesive. A hot melt adhesive is molten at application conditions but solidifies under ambient conditions. Hot melt adhesives may be a single polymer but more typically a blend of different polymers or polymer precursors and may include tackifiers, plasticizers, or other functional additives.

One acceptable form for the polymer auxiliary bonding agent is as a colloidal dispersion of the polymer or polymer precursor in a liquid system that is primarily aqueous in nature. Natural or synthetic polymers may suitable for use in the present invention. Natural latex or synthetic dispersions based upon styrene-butadiene copolymers, acrylic polymers, vinyl acetate polymers, ethylene vinyl acetate copolymers, vinyl chloride polymers, ethylene vinyl chloride copolymers, acrylic vinyl acetate copolymers, ethylene vinyl chloride vinyl acetate terpolymers, acrylic vinyl chloride copolymers, nitrile polymers or any other similar suitable polymer dispersion are acceptable as the polymer based auxiliary bonding agent of the present invention. Glass transition temperatures above about −25° C. are preferred to prevent the polymer from being too sticky. Since these polymers are included in a limited zone, it may not be necessary to limit the glass transition temperature on the high end though glass transition temperatures less than about 30° C. may be preferred to prevent the bonding from being too stiff. Similarly, it may be desirable to leave the agent partially uncured after being applied, i.e. partially prevent it from polymerizing or crosslinking with itself and/or the fibers of the fibrous structure, if such crosslinking is deemed to increase the stiffness of the resulting web.

Auxiliary Bonded Fibrous Structure/Sanitary Tissue Product

Figure 2:
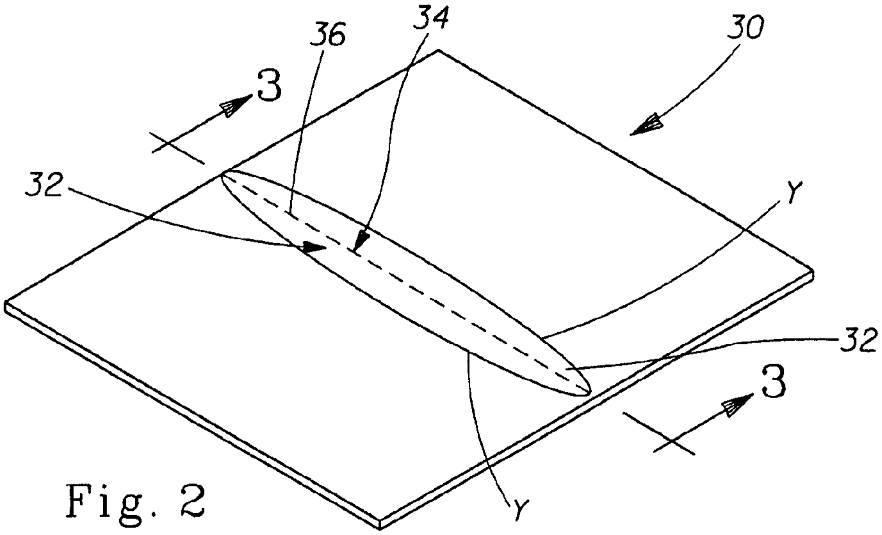
FIG. 2 is a schematic representation of a fibrous structure according to the present invention.
Figure 3:
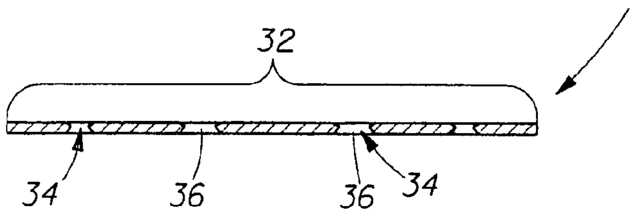
FIG. 3 is a cross-sectional representation of the fibrous structure of FIG. 2 taken along line 3-3.

As shown in FIGS. 2 and 3, a fibrous structure according to the present invention 30 comprises a discrete region of auxiliary bonding 32 and a discrete region of fiber disruption 34 comprising a plurality of fiber disruption subregions 36, in this case a perforation region. Fibers within the perforation region have been cut. The region of fiber disruption is made by contacting the fibrous structure 30 with a perf blade (not shown). The region of fiber disruption 34 is contained within the region of auxiliary bonding 32 (imaginary lines Y are shown in the drawing to depict the region of auxiliary bonding).

Figure 4:
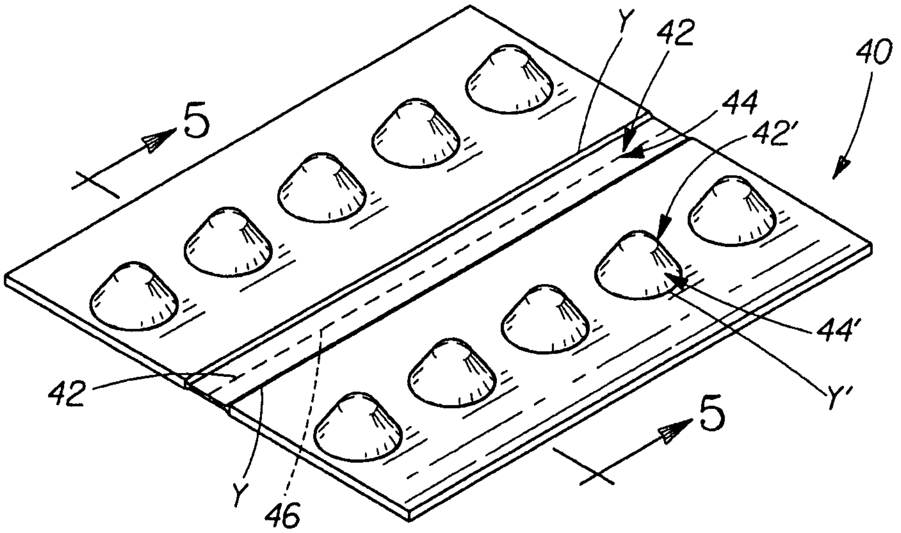
FIG. 4 is a schematic representation of another example of a fibrous structure according to the present invention.
Figure 5:
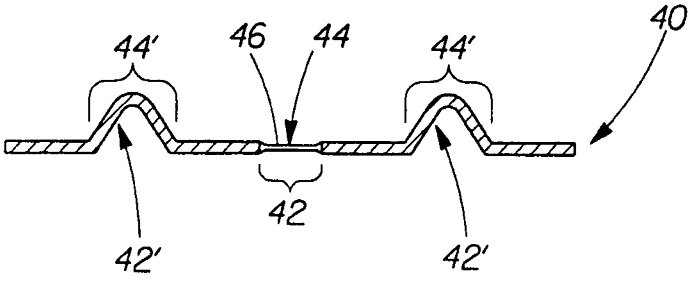
FIG. 5 is a cross-sectional representation of the fibrous structure of FIG. 4 taken along line 5-5.

As shown in FIGS. 4 and 5, a fibrous structure according to the present invention 40 comprises a first discrete region of auxiliary bonding 42, a second discrete region of auxiliary bonding 42', a first discrete region of fiber disruption 44, in this case a perforation region, and a second region of fiber disruption 44', in this case a protruding region; namely, and embossed region which comprises an embossment. Fibers within the perforation region have been cut. Fibers within the protruding region have been stretched and/or pulled apart. The perforation region is formed by contacting the fibrous structure 40 with a perf blade (not shown). The protruding region is formed by contacting the fibrous structure 40 with an emboss roll. For example, the protruding region is formed by passing the fibrous structure 40 between an emboss roll and another roll, such as a steel roll or a rubber roll or a mating roll. The fibrous structures of the present invention may comprise one or more regions of fiber disruption. The region of fiber disruption 44 is contained within the region of auxiliary bonding 42 (imaginary lines Y are shown to depict the region of auxiliary bonding). The region of fiber disruption 44' is contained within the region of auxiliary bonding 42' (imaginary line Y' is shown in the drawing to depict the region of auxiliary bonding, which comprises a protruding region in this example).

Figure 6:
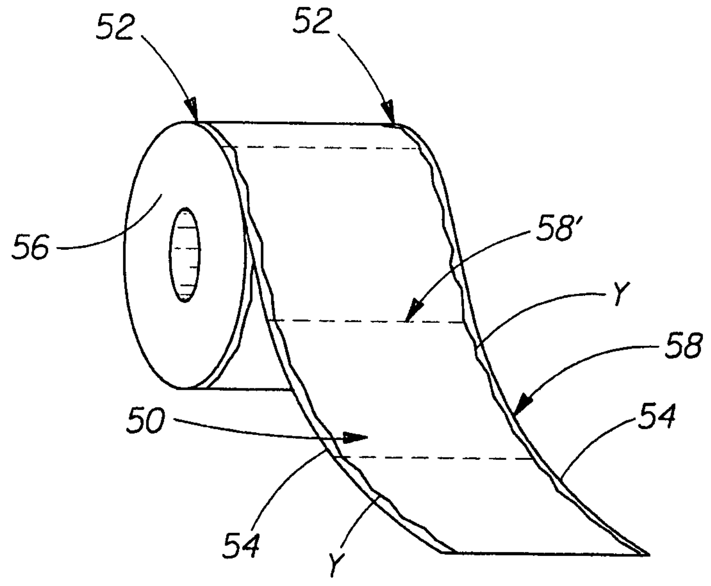
FIG. 6 is a schematic representation of another example of a fibrous structure according to the present invention.

Auxiliary bonding may be created within any portion of a fibrous structure. As shown in FIG. 6, regions of auxiliary bonding 52 (imaginary lines Y are shown in the drawing to depict the region of auxiliary bonding) are present proximate the edges 54 of the fibrous structure 50 such that when a roll of sanitary tissue product 56 comprising the fibrous structure 50 is used by a consumer, the edges 54 of the roll of the sanitary tissue product 56 produce less dust than if the auxiliary bonding was not present therein. The edges 54 comprise regions of fiber disruption 58, a saw cut region, in particular, which are produced by log sawing a roll of fibrous structure 50. As shown in FIG. 6, the fibrous structure 50 further comprises regions of fiber disruption 58', perforation regions. The perforation regions may be contained within a region of auxiliary bonding (not shown).

Any of the regions of auxiliary bonding within the fibrous structures and/or sanitary tissue products of the present invention may comprise an auxiliary bonding agent, which may be a dust inhibiting agent and/or a low migration agent.

Methods for Making Fibrous Structures of the Present Invention

The fibrous structures of the present invention may be made by any suitable method known in the art. Nonlimiting examples of suitable methods include imparting fiber disruption regions and/or subregions into the fibrous structure. In one example, fiber disruption may be imparted to the fibrous structure by cutting, mashing, sawing, punching, perforating, embossing, tearing, stretching, needle punching, tuft generating and combinations thereof.

An auxiliary bonding agent may be applied to the fibrous structure to create an auxiliary bonding region such that the auxiliary bonding region contains a fiber disruption region within it. The auxiliary bonding agent may be applied to the fibrous structure prior to, concurrently and/or after the creation of the fiber disruption region within the fibrous structure. The auxiliary bonding agent may be applied to a fiber disruption apparatus such that it is transferred to the fibrous structure upon the fiber disruption apparatus contacting the fibrous structure.

The fiber disruption region may be a perforation region, a saw cut region, a protruding region and combinations thereof. A fibrous structure may comprise one or more different types of fiber disruption regions. The protruding region may be formed while the fibrous structure exhibits a moisture content of greater than about 20%. For example, a protruding region may be created in the fibrous structure before the fibrous structure contacts a cylindrical dryer, such as a Yankee dryer. In another example, the protruding region may be formed while the fibrous structure exhibits a moisture content of less than about 20%. For example, a protruding region may be created in the fibrous structure after the fibrous structure contacts a cylindrical dryer, such as a Yankee dryer.

In one example, the fiber disruption region may be a solid state disruption zone.

As stated previously, regions of auxiliary bonding within the fibrous structures and/or sanitary tissue products of the present invention may be created by any number of processes known in the art, e.g. an auxiliary bonding agent may be applied by extrusion coating, transfer methods including printing, spraying and/or fiberizing. In particular, a region of auxiliary bonding may be created by using a transfer method wherein the transfer surface includes the surface causing fiber disruption.

Figure 7:
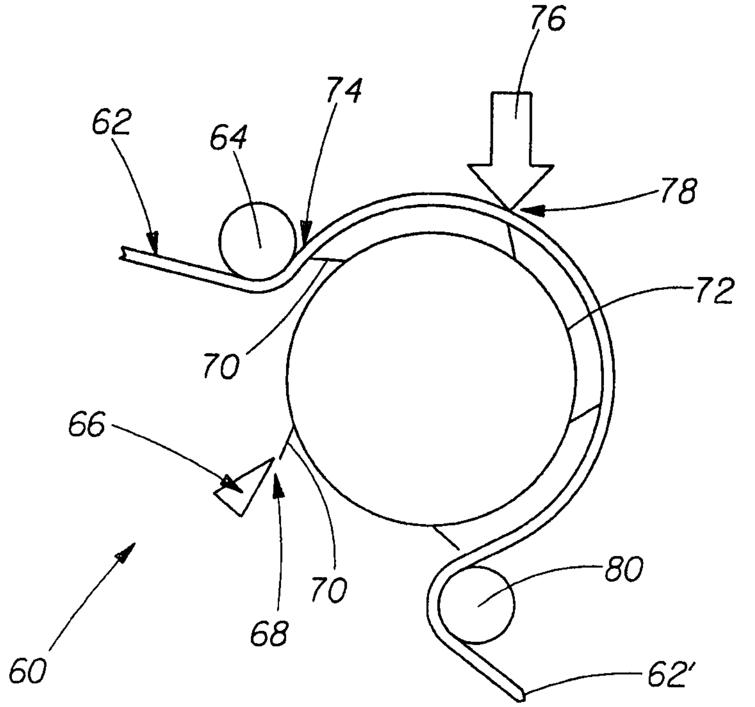
FIG. 7 is a schematic representation of one of the methods of the present invention applying an auxiliary bonding agent or dust inhibiting agent to the perforation region of a fibrous structure.

A nonlimiting example of a suitable process for making a fibrous structure according to the present invention is shown in FIG. 7. FIG. 7. shows a schematic representation of a fiber disruption process; namely, a perforation process 60, wherein a fibrous structure 62, prior to fiber disruption, in this case a solid state disruption (perfing), and auxiliary bonding, is guided into position by turning roll 64 whilst an extrusion device 66 transfers at point 68 a metered amount of an auxiliary bonding agent, such as a lubricant, to a perforation blade (perf blade) 70 revolving on a perforation roll surface 72. At the point of contact 74 of the perforation blade 70 with the fibrous structure 62, the auxiliary bonding agent is transferred to the fibrous structure 62 in a zone within the fibrous structure 62 that will be subjected to fiber disruption, i.e. cut, by the perforation blade 70 when the perforation blade 70 and the fibrous structure 62 become proximate with the perforation anvil 76 at point 78. The disrupted and auxiliary bonded fibrous structure 62' is guided away from the perforation roll surface 72 by roller 80.

EXAMPLES

Example 1

A reference sanitary tissue product is created by making a two ply fibrous structure suitable for converting into toilet tissue by laminating plies of through-air-dried paper fibrous structures on a toilet tissue converting line. Approximately 1" wide bands of pressure sensitive hot melt adhesive are continuously applied to one of the fibrous structures on 4.5" centers and the two fibrous structures are passed through a combining nip to laminate them into a two-ply fibrous structure. The combined fibrous structure is perforated into 4" sheets using perf blades having 99 binding sites (i.e. gaps) each 0.011"±0.001" wide per 4.5" roll acting against a rotating anvil roll. The angle of entry of the web path into the perf blade anvil nip is positioned so the web only contacts the anvil roll at the point of minimum clearance between the perf blade and anvil roll. The perforated fibrous structure is then wound into logs on 1.71" cores until 200 sheets are accumulated on each log. The fibrous structure logs are then conveyed to the log saw to saw 4.5" wide sanitary toilet tissue product; the log saw is a PCMC R961 log sawing machine. Properties of the sanitary tissue product are shown in Table I, below Example 2

To illustrate one aspect of the present invention, the fibrous structure and sanitary tissue product-making of Example 1 is repeated except a slot extruder is positioned to uniformly coat the anvil roll with STP® oil treatment. STP® oil treatment is a product of Armor All/STP Products Company of Oakland Calif. and is a mineral oil containing an olefin co-polymer which serves to make it a low migration lubricant (an auxiliary bonding agent). As the perf blade contacts the fibrous structure, the fibrous structure is forced down to the anvil roll and the oil is transferred into the fibrous structure covering the solid state disruption zone. The STP® oil treatment is added at approximately 3% by weight. The rolls are stored at room temperature for 6 weeks prior to testing for dispensing dust. At that time the width of the STP® oil treatment across the perfs is ⅜" wide at maximum migration. Properties of this sanitary tissue product are shown in Table I, below.

TABLE I

| | Example 1 | Example 2 |
|---|---|---|
| Dispensing Tensile (g/in) | 216 | 147 |
| Lint | 7.7 | 7.7 |
| Density (g/cc) | 0.079 | 0.079 |
| Dispensing Dust | 5342 | 3286 |
| Lint Normalized Dispensing Dust | 4856 | 2987 |
| Tensile Normalized Dispensing Dust | 3710 | 3353 |
| Density Normalized Dispensing Dust | 5410 | 3328 |

Example 3

To illustrate another aspect of the present invention, fibrous structure product logs from Example 1 are conveyed to the log saw to saw 4.5" wide sanitary toilet tissue product; however at this point the existing oiling mechanism of the PCMC R961 log sawing machine is utilized to deliver auxiliary bonding agent to the cutting blade for deposition to the saw cut area of the sanitary tissue product. The auxiliary bonding agent is a low migration lubricant (STP® oil treatment). It is delivered continuously through the oiling mechanism at a rate sufficient to deposit 3% by weight to the sanitary tissue product. The transfer of the lubricant to the solid state disruption zone (the saw cut) occurs as the blade passes through the log, the lubricant is deposited onto the cut surface. Example 3 is observed to have much lower dust arising from the saw cut solid state disruption zone compared to Example 1.

Example 4

Another reference sanitary tissue product is created by embossing the two ply fibrous structure from Example 1 after laminating using steel-to-steel embossing nip having emboss elements at a frequency of about 25/sq in. Each male element is essentially hemispherical in shape and engages matching female hemisphere recesses. The domes are approximately 0.085" in height and engage about 0.060" deep into the female pockets at maximum engagement. The engagement of the two rolls creates a solid state disruption zone at each embossment.

Example 5

To illustrate another aspect of the present invention, Example 4 is repeated except that an auxiliary bonding agent is applied to the solid state disruption zone by the female embossing roll. This is accomplished by filling the female embossing roll with a low migration lubricant (petrolatum grade G1813 from Crompton, Inc. of Petrolia, Pa.) and doctoring off excess such that only the recesses contain the low migration lubricant. The temperature of the embossing roll is controlled so that the filling and transfer of the petrolatum is about 3% by weight of the lubricant onto the two ply sanitary tissue product. The resultant sanitary tissue product of Example 5 is observed to have much lower tendency to release dust than Example 4.

Lint Test Method:

The amount of lint generated from a fibrous structure and/or sanitary tissue product) is determined with a Sutherland Rub Tester. This tester uses a motor to rub a weighted felt 5 times over the fibrous structure, while the fibrous structure is restrained in a stationary position. This fibrous structure can be is referred to throughout this method as the "web". The Hunter Color L value is measured before and after the rub test. The difference between these two Hunter Color L values is then used to calculate a lint value.

i. Sample Preparation—Prior to the lint rub testing, the samples to be tested should be conditioned according to Tappi Method #T4020M-88. Here, samples are preconditioned for 24 hours at a relative humidity level of 10 to 35% and within a temperature range of 22° C. to 40° C. After this preconditioning step, samples should be conditioned for 24 hours at a relative humidity of 48 to 52% and within a temperature range of 22° C. to 24° C. This rub testing should also take place within the confines of the constant temperature and humidity room.

The Sutherland Rub Tester may be obtained from Testing Machines, Inc. (Amityville, N.Y., 1701). The web is first prepared by removing and discarding any product which might have been abraded in handling, e.g. on the outside of the roll. For products formed from multiple plies of webs, this test can be used to make a lint measurement on the multi-ply product, or, if the plies can be separated without damaging the specimen, a measurement can be taken on the individual plies making up the product. If a given sample differs from surface to surface, it is necessary to test both surfaces and average the values in order to arrive at a composite lint value. In some cases, products are made from multiple-plies of webs such that the facing-out surfaces are identical, in which case it is only necessary to test one surface. If both surfaces are to be tested, it is necessary to obtain six specimens for testing (Single surface testing only requires three specimens). Each specimen should be folded in half such that the crease is running along the cross direction (CD) of the web sample. For two-surface testing, make up 3 samples with a first surface "out" and 3 with the second-side surface "out". Keep track of which samples are first surface "out" and which are second surface out.

Obtain a 30".times.40" piece of Crescent #300 cardboard from Cordage Inc. (800 E. Ross Road, Cincinnati, Ohio, 45217). Using a paper cutter, cut out six pieces of cardboard of dimensions of 2.5".times.6". Puncture two holes into each of the six cards by forcing the cardboard onto the hold down pins of the Sutherland Rub tester. Center and carefully place each of the 2.5×6" cardboard pieces on top of the six previously folded samples. Make sure the 6" dimension of the cardboard is running parallel to the machine direction (MD) of each of the tissue samples. Center and carefully place each of the cardboard pieces on top of the three previously folded samples. Once again, make sure the 6" dimension of the cardboard is running parallel to the machine direction (MD) of each of the web samples.

Fold one edge of the exposed portion of the web specimen onto the back of the cardboard. Secure this edge to the cardboard with adhesive tape obtained from 3M Inc. (¾' wide Scotch Brand, St. Paul, Minn.). Carefully grasp the other over-hanging tissue edge and snugly fold it over onto the back of the cardboard. While maintaining a snug fit of the web specimen onto the board, tape this second edge to the back of the cardboard. Repeat this procedure for each sample.

Turn over each sample and tape the cross direction edge of the web specimen to the cardboard. One half of the adhesive tape should contact the web specimen while the other half is adhering to the cardboard. Repeat this procedure for each of the samples. If the tissue sample breaks, tears, or becomes frayed at any time during the course of this sample preparation procedure, discard and make up a new sample with a new tissue sample strip.

There will now be 3 first-side surface "out" samples on cardboard and (optionally) 3 second-side surface "out" samples on cardboard.

ii. Felt Preparation—Obtain a 30".times.40" piece of Crescent #300 cardboard from Cordage Inc. (800 E. Ross Road, Cincinnati, Ohio, 45217). Using a paper cutter, cut out six pieces of cardboard of dimensions of 2.25".times.7.25". Draw two lines parallel to the short dimension and down 1.125" from the top and bottom most edges on the white side of the cardboard. Carefully score the length of the line with a razor blade using a straight edge as a guide. Score it to a depth about half way through the thickness of the sheet. This scoring allows the cardboard/felt combination to fit tightly around the weight of the Sutherland Rub tester. Draw an arrow running parallel to the long dimension of the cardboard on this scored side of the cardboard.

Cut the six pieces of black felt (F-55 or equivalent from New England Gasket, 550 Broad Street, Bristol, Conn. 06010) to the dimensions of 2.25".times.8.5".times.0.0625". Place the felt on top of the unscored, green side of the cardboard such that the long edges of both the felt and cardboard are parallel and in alignment. Make sure the fluffy side of the felt is facing up. Also allow about 0.5" to overhang the top and bottom most edges of the cardboard. Snugly fold over both overhanging felt edges onto the backside of the cardboard with Scotch brand tape. Prepare a total of six of these felt/cardboard combinations.

For best reproducibility, all samples should be run with the same lot of felt. Obviously, there are occasions where a single lot of felt becomes completely depleted. In those cases where a new lot of felt must be obtained, a correction factor should be determined for the new lot of felt. To determine the correction factor, obtain a representative single web sample of interest, and enough felt to make up 24 cardboard/felt samples for the new and old lots.

As described below and before any rubbing has taken place, obtain Hunter L readings for each of the 24 cardboard/felt samples of the new and old lots of felt. Calculate the averages for both the 24 cardboard/felt samples of the old lot and the 24 cardboard/felt samples of the new lot.

Next, rub test the 24 cardboard/felt boards of the new lot and the 24 cardboard/felt boards of the old lot as described below. Make sure the same web lot number is used for each of the 24 samples for the old and new lots. In addition, sampling of the web in the preparation of the cardboard/tissue samples must be done so the new lot of felt and the old lot of felt are exposed to as representative as possible of a tissue sample. Discard any product which might have been damaged or abraded. Next, obtain 48 web samples for the calibration. Place the first sample on the far left of the lab bench and the last of the 48 samples on the far right of the bench. Mark the sample to the far left with the number "1" in a 1 cm by 1 cm area of the corner of the sample. Continue to mark the samples consecutively up to 48 such that the last sample to the far right is numbered 48.

Use the 24 odd numbered samples for the new felt and the 24 even numbered samples for the old felt. Order the odd number samples from lowest to highest. Order the even numbered samples from lowest to highest. Now, mark the lowest number for each set with a letter "F" (for "first-side") Mark the next highest number with the letter "S" (for second-side). Continue marking the samples in this alternating "F"/"S" pattern. Use the "F" samples for first surface "out" lint analyses and the "S" samples for second-side surface "out" lint analyses. There are now a total of 24 samples for the new lot of felt and the old lot of felt. Of this 24, twelve are for first-side surface "out" lint analysis and 12 are for second-side surface "out" lint analysis.

Rub and measure the Hunter Color L values for all 24 samples of the old felt as described below. Record the 12 first-side surface Hunter Color L values for the old felt. Average the 12 values. Record the 12 second-side surface Hunter Color L values for the old felt. Average the 12 values. Subtract the average initial un-rubbed Hunter Color L felt reading from the average Hunter Color L reading for the first-side surface rubbed samples. This is the delta average difference for the first-side surface samples. Subtract the average initial un-rubbed Hunter Color L felt reading from the average Hunter Color L reading for the second-side surface rubbed samples. This is the delta average difference for the second-side surface samples. Calculate the sum of the delta average difference for the first-side surface and the delta average difference for the second-side surface and divide this sum by 2. This is the uncorrected lint value for the old felt. If there is a current felt correction factor for the old felt, add it to the uncorrected lint value for the old felt. This value is the corrected Lint Value for the old felt.

Rub and measure the Hunter Color L values for all 24 samples of the new felt as described below. Record the 12 first-side surface Hunter Color L values for the new felt. Average the 12 values. Record the 12 second-side surface Hunter Color L values for the new felt. Average the 12 values. Subtract the average initial un-rubbed Hunter Color L felt reading from the average Hunter Color L reading for the first-side surface rubbed samples. This is the delta average difference for the first-side surface samples. Subtract the average initial un-rubbed Hunter Color L felt reading from the average Hunter Color L reading for the second-side surface rubbed samples. This is the delta average difference for the second-side surface samples. Calculate the sum of the delta average difference for the first side surface and the delta average difference for the second-side surface and divide this sum by 2. This is the uncorrected lint value for the new felt.

Take the difference between the corrected Lint Value from the old felt and the uncorrected lint value for the new felt. This difference is the felt correction factor for the new lot of felt. Adding this felt correction factor to the uncorrected lint value for the new felt should be identical to the corrected Lint Value for the old felt. Note that the above procedure implies that the calibration is done with a two-surfaced specimen. If it desirable or necessary to do a felt calibration using a single-surfaced sample, it is satisfactory; however, the total of 24 tests should still be done for each felt.

iii. Care of 4 Pound Weight—The four pound weight has four square inches of effective contact area providing a contact pressure of one pound per square inch. Since the contact pressure can be changed by alteration of the rubber pads mounted on the face of the weight, it is important to use only the rubber pads supplied by the manufacturer (Brown Inc., Mechanical Services Department, Kalamazoo, Mich.). These pads must be replaced if they become hard, abraded or chipped off. When not in use, the weight must be positioned such that the pads are not supporting the full weight of the weight. It is best to store the weight on its side.

iv. Rub Tester Instrument Calibration—The Sutherland Rub Tester must first be calibrated prior to use. First, turn on the Sutherland Rub Tester by moving the tester switch to the "cont" position. When the tester arm is in its position closest to the user, turn the tester's switch to the "auto" position. Set the tester to run 5 strokes by moving the pointer arm on the large dial to the "five" position setting. One stroke is a single and complete forward and reverse motion of the weight. The end of the rubbing block should be in the position closest to the operator at the beginning and at the end of each test.

Prepare a test specimen on cardboard sample as described above. In addition, prepare a felt on cardboard sample as described above. Both of these samples will be used for calibration of the instrument and will not be used in the acquisition of data for the actual samples.

Place this calibration web sample on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the web sample and not the web sample itself. The felt must rest flat on the tissue sample and must be in 100% contact with the web surface. Activate the tester by depressing the "push" button. Keep a count of the number of strokes and observe and make a mental note of the starting and stopping position of the felt covered weight in relationship to the sample. If the total number of strokes is five and if the end of the felt covered weight closest to the operator is over the cardboard of the web sample at the beginning and end of this test, the tester is calibrated and ready to use. If the total number of strokes is not five or if the end of the felt covered weight closest to the operator is over the actual web sample either at the beginning or end of the test, repeat this calibration procedure until 5 strokes are counted the end of the felt covered weight closest to the operator is situated over the cardboard at the both the start and end of the test. During the actual testing of samples, monitor and observe the stroke count and the starting and stopping point of the felt covered weight. Recalibrate when necessary.

v. Hunter Color Meter Calibration—Adjust the Hunter Color Difference Meter for the black and white standard plates according to the procedures outlined in the operation manual of the instrument. Also run the stability check for standardization as well as the daily color stability check if this has not been done during the past eight hours. In addition, the zero reflectance must be checked and readjusted if necessary. Place the white standard plate on the sample stage under the instrument port. Release the sample stage and allow the sample plate to be raised beneath the sample port. Using the "L-Y", "a-X", and "b-Z" standardizing knobs, adjust the instrument to read the Standard White Plate Values of "L", "a", and "b" when the "L", "a", and "b" push buttons are depressed in turn.

vi. Measurement of Samples—The first step in the measurement of lint is to measure the Hunter color values of the black felt/cardboard samples prior to being rubbed on the web sample. The first step in this measurement is to lower the standard white plate from under the instrument port of the Hunter color instrument. Center a felt covered cardboard, with the arrow pointing to the back of the color meter, on top of the standard plate. Release the sample stage, allowing the felt covered cardboard to be raised under the sample port.

Since the felt width is only slightly larger than the viewing area diameter, make sure the felt completely covers the viewing area. After confirming complete coverage, depress the L push button and wait for the reading to stabilize. Read and record this L value to the nearest 0.1 unit.

If a D25D2A head is in use, lower the felt covered cardboard and plate, rotate the felt covered cardboard 90 degrees so the arrow points to the right side of the meter. Next, release the sample stage and check once more to make sure the viewing area is completely covered with felt. Depress the L push button. Read and record this value to the nearest 0.1 unit. For the D25D2M unit, the recorded value is the Hunter Color L value. For the D25D2A head where a rotated sample reading is also recorded, the Hunter Color L value is the average of the two recorded values.

Measure the Hunter Color L values for all of the felt covered cardboards using this technique. If the Hunter Color L values are all within 0.3 units of one another, take the average to obtain the initial L reading. If the Hunter Color L values are not within the 0.3 units, discard those felt/cardboard combinations outside the limit. Prepare new samples and repeat the Hunter Color L measurement until all samples are within 0.3 units of one another.

For the measurement of the actual web sample/cardboard combinations, place the web sample/cardboard combination on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight Hook this weight onto the tester arm and gently place the web sample underneath the weight/felt combination. The end of the weight closest to the operator must be over the cardboard of the web sample and not the web sample itself. The felt must rest flat on the web sample and must be in 100% contact with the web surface.

Next, activate the tester by depressing the "push" button. At the end of the five strokes the tester will automatically stop. Note the stopping position of the felt covered weight in relation to the sample. If the end of the felt covered weight toward the operator is over cardboard, the tester is operating properly. If the end of the felt covered weight toward the operator is over sample, disregard this measurement and recalibrate as directed above in the Sutherland Rub Tester Calibration section.

Remove the weight with the felt covered cardboard. Inspect the web sample. If torn, discard the felt and web sample and start over. If the web sample is intact, remove the felt covered cardboard from the weight. Determine the Hunter Color L value on the felt covered cardboard as described above for the blank felts. Record the Hunter Color L readings for the felt after rubbing. Rub, measure, and record the Hunter Color L values for all remaining samples. After all web specimens have been measured, remove and discard all felt. Felts strips are not used again. Cardboards are used until they are bent, torn, limp, or no longer have a smooth surface.

vii. Calculations—Determine the delta L values by subtracting the average initial L reading found for the unused felts from each of the measured values for the first-side surface and second-side surface sides of the sample as follows.

For samples measured on both surfaces, subtract the average initial L reading found for the unused felts from each of the three first-side surface L readings and each of the three second-side surface L readings. Calculate the average delta for the three first-side surface values. Calculate the average delta for the three second-side surface values. Subtract the felt factor from each of these averages. The final results are termed a lint for the first-side surface and a lint for the second-side surface of the web.

By taking the average of the lint value on the first-side surface and the second-side surface, the lint is obtained which is applicable to that particular web or product. In other words, to calculate lint value, the following formula is used:

$$\text{Lint Value} = \frac{\text{Lint Value, first-side} + \text{Lint Value, second-side}}{2}$$

For samples measured only for one surface, subtract the average initial L reading found for the unused felts from each of the three L readings. Calculate the average delta for the three surface values. Subtract the felt factor from this average. The final result is the lint value for that particular web or product.

Dispensing Dust Test Method

Dust is measured using a particle counter commercially available (Sympatec QICPIC, Sympatec GmbH, Am Pulverhaus 1, 38678 Clausthal-Zellerfeld, Germany). The instrument is used according to the manufacturer's recommendation and a frame rate of 400 frames/sec is selected. The particle size range is set to 20 to 10,000 micrometers. Sympatec's standard chute for guiding particles into the instrument was modified by removing the flights within the chute and by attaching a funnel to the top of the chute. The funnel is constructed of stainless steel and has 4 trapezoidal sides, 14 inches across the wide part (top), tapering to 2 inches wide at the bottom, i.e. point of attachment with the chute. The trapezoid sides are 12 inches long. A vacuum is attached to the exit of the instrument to create an airflow through the instrument, and consequently the chute and the funnel. The vacuum is sufficient to create an airspeed entering the funnel of 470 feet/min. The airspeed is measured using an Extech Instruments ThermoAnemometer Model 407113 and Anemometer metal probe, SN Q138487. The probe was mounted in a plastic tube in a square of foam (necessitated by the square shape of the funnel). The probe assembly was placed in the funnel so that the foam sealed against the funnel walls and the anemometer was centered above the shaft opening. The linear flow was calculated for the bottom of the funnel where the drop shaft begins (the 2"x2" opening).

To perform the dust test, sanitary tissue product is dispensed, i.e. pulled apart at the perforations, manually at the top of the funnel to release dust. The force to rupture the product at the perforations is a function of the dispensing tensile and the operator merely applies enough force directly in tension across the perforations to dispense the product in a manner typical of tissue dispensing. Care should be taken not to tear the product across the perforations, rather it should be dispensed by pulling directly in tension across the perforations. The dust fibers and/or particles so liberated are directed into a modified Sympatec chute and the chute delivers them to the measurement zone of the instrument by gravity and vacuum.

The QICPIC measures the number of particles passing through the measurement zone using dynamic image analysis. Five perforations are separated per measurement and the Raw Dispensing Dust value is simply the total number of particles counted.

The raw data needs to be normalized for width of the product at the perforations. The Raw Dispensing Dust value is multiplied by the width of the product at the perforations in inches and divided by 4.5. This result is the Dispensing Dust value. Products more than about 6" wide should be precut in width with scissors to 4.5 inches wide prior to testing to prevent being too wide to dispense properly in tension.

The Normalized Dispensing Dust value is determined by any one of the following relationships: 1) Dispensing Dust value divided by Dispensing Tensile and multiplied by 150 yields the Tensile Normalized Dispensing Dust value; 2) Dispensing Dust Value divided by Lint test result and multiplied by 7 yields the Lint Normalized Dispensing Dust value; and 3) Dispensing Dust value divided by the product Density and multiplied by 0.08 yields the Density Normalized Dispensing Dust value.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A single- or multi-ply sanitary tissue product comprising two or more contiguous sheets perforated by a perforation region such that the two or more contiguous sheets can be separated from one another during use by a consumer, wherein the sanitary tissue product exhibits a density of less than 0.15 g/cm$^3$ and comprises a fibrous structure comprising wood pulp fibers and a region of auxiliary bonding comprising an auxiliary bonding agent, wherein the auxiliary bonding agent comprises a dust inhibiting agent and wherein the region of auxiliary bonding contains within it a region of fiber disruption comprising a perforation region, wherein both regions are discrete and wherein the perforation region is contained within the auxiliary bonding agent.

2. The single- or multi-ply sanitary tissue product according to claim 1 wherein the region of fiber disruption further comprises protruding regions.

3. The single- or multi-ply sanitary tissue product according to claim 1 wherein the region of fiber disruption is a solid state disruption zone.

4. The single- or multi-ply sanitary tissue product according to claim 1 wherein the sanitary tissue product is a single-ply.

5. The single- or multi-ply sanitary tissue product according to claim 1 wherein the fibrous structure is convolutedly wound upon itself to form a roll of the sanitary tissue product.

6. A single- or multi-ply sanitary tissue product comprising two or more contiguous sheets perforated by a perforation region such that the two or more contiguous sheets can be separated from one another during use by a consumer, wherein the sanitary tissue product exhibits a density of less than 0.15 g/cm$^3$ and comprises a fibrous structure comprising wood pulp fibers that exhibits a normalized dispensing dust value of less than about 3500, wherein the fibrous structure comprises a region of auxiliary bonding comprising an auxiliary bonding agent, wherein the auxiliary bonding agent comprises a dust inhibiting agent and wherein the region of auxiliary bonding contains within it a region of fiber disruption comprising a perforation region, wherein both regions are discrete and wherein the perforation region is contained within the auxiliary bonding agent.

7. A single- or multi-ply sanitary tissue product comprising two or more contiguous sheets perforated by a perforation region such that the two or more contiguous sheets can be separated from one another during use by a consumer, wherein the sanitary tissue product exhibits a density of less than 0.15 g/cm$^3$ and comprises a fibrous structure comprising wood pulp fibers which has a dispensing dust value reduced by creating a region of auxiliary bonding wherein the region of auxiliary bonding comprises an auxiliary bonding agent and alters the dispensing dust by decreasing the normalized dispensing dust relative to the fibrous structure without the region of auxiliary bonding, wherein the auxiliary bonding agent comprises a dust inhibiting agent and wherein the region of auxiliary bonding contains within it a region of fiber disruption comprising a perforation region, wherein both regions are discrete and wherein the perforation region is contained within the auxiliary bonding agent.

8. The single- or multi-ply sanitary tissue product according to claim 7 wherein the area affected by the auxiliary bonding comprises less than 50% of the total area.

9. A single-ply sanitary tissue product comprising two or more contiguous sheets perforated by a perforation region such that the two or more contiguous sheets can be separated from one another during use by a consumer, wherein the sanitary tissue product exhibits a density of less than 0.15 g/cm$^3$ and comprises wood pulp fibers, a solid state disruption zone comprising a perforation region, and an auxiliary bonding region comprising an auxiliary bonding agent within the sanitary tissue product, wherein the auxiliary bonding agent comprises a dust inhibiting agent and wherein the zone and the region partially overlap, wherein both regions are discrete and wherein the perforation region is contained within the auxiliary bonding agent.

* * * * *